(12) United States Patent
Kim et al.

(10) Patent No.: US 8,691,414 B2
(45) Date of Patent: Apr. 8, 2014

(54) BATTERY MODULE HAVING COOLANT PASSAGE AND GAS EXHAUST PASSAGE

(75) Inventors: Tae-Yong Kim, Yongin-si (KR); Jun-Pyo Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1375 days.

(21) Appl. No.: 12/079,365

(22) Filed: Mar. 26, 2008

(65) Prior Publication Data
US 2009/0202897 A1    Aug. 13, 2009

(30) Foreign Application Priority Data
Nov. 12, 2007    (KR) .................. 10-2007-0114939

(51) Int. Cl.
  *H01M 2/12*    (2006.01)
  *H01M 10/50*    (2006.01)

(52) U.S. Cl.
  USPC ............. 429/120; 429/71; 429/82; 429/83

(58) Field of Classification Search
  USPC .................. 429/71, 72, 82, 83, 120, 70
  See application file for complete search history.

(56) References Cited

U.S. PATENT DOCUMENTS

| | | | |
|---|---|---|---|
| 4,158,802 A | 6/1979 | Rose, II | |
| 4,470,652 A | 9/1984 | Schwab | |
| 4,736,921 A | 4/1988 | Zane et al. | |
| 5,900,332 A | 5/1999 | Marukawa et al. | |
| 2005/0070164 A1 | 3/2005 | Mita et al. | |
| 2006/0078789 A1 | 4/2006 | Wegner | |
| 2006/0270277 A1 | 11/2006 | Zhao et al. | |
| 2007/0141452 A1 | 6/2007 | Kim | |
| 2008/0182162 A1 | 7/2008 | Kim | |
| 2009/0123819 A1 | 5/2009 | Kim | |
| 2009/0123820 A1 | 5/2009 | Han | |
| 2010/0119928 A1 | 5/2010 | Yoon | |
| 2010/0178548 A1 | 7/2010 | Baek | |

FOREIGN PATENT DOCUMENTS

| | | |
|---|---|---|
| EP | 1 309 019 A2 | 5/2003 |
| EP | 1 746 679 A1 | 1/2007 |
| EP | 1 705 743 B1 | 9/2007 |
| JP | 08-293300 | 11/1996 |
| JP | 09-190811 | 7/1997 |
| JP | 10-003950 | 1/1998 |
| JP | 10-106533 | 4/1998 |
| JP | 10-270095 | 10/1998 |
| JP | 11-054157 | 2/1999 |

(Continued)

OTHER PUBLICATIONS

Extended Search Report dated Aug. 12, 2010 for corresponding application No. EP 08150025.8-2119 / 1953849.

(Continued)

*Primary Examiner* — Jonathan G Leong
(74) *Attorney, Agent, or Firm* — Knobbe, Martens, Olson & Bear, LLP

(57) ABSTRACT

The present invention relates to a battery module including a plurality of unit batteries. The battery module includes the plurality of unit batteries electrically connected to each other, a housing having a plurality of penetration holes in which the unit batteries are provided to respective correspond to the unit batteries, and a duct member combined with the housing to cover electrode terminals of the unit batteries. The duct member includes a coolant passage through which a coolant is provided to the penetration hole and a gas exhaust passage for exhausting gas generated from the unit batteries in a predetermined direction.

14 Claims, 11 Drawing Sheets

(56) References Cited

FOREIGN PATENT DOCUMENTS

| | | |
|---|---|---|
| JP | 11144766 A2 | 5/1999 |
| JP | 2001-126703 | 5/2001 |
| JP | 2001-155789 | 6/2001 |
| JP | 2001-307695 | 11/2001 |
| JP | 2001-345088 | 12/2001 |
| JP | 2001-345089 | 12/2001 |
| JP | 2002-184385 | 6/2002 |
| JP | 2002-298822 | 10/2002 |
| JP | 2002-352793 | 12/2002 |
| JP | 2002359014 A2 | 12/2002 |
| JP | 2003-109558 | 4/2003 |
| JP | 2003-109675 | 4/2003 |
| JP | 2004-087218 | 3/2004 |
| JP | 2005-026219 | 1/2005 |
| JP | 2005-349955 | 12/2005 |
| JP | 2006-127921 | 5/2006 |
| JP | 2006-179190 | 7/2006 |
| JP | 2006-185894 | 7/2006 |
| JP | 2008-533682 | 8/2008 |
| KR | 0176553 | 4/2000 |
| KR | 10-20010036651 | 5/2001 |
| KR | 1020060028057 | 3/2006 |
| KR | 1020060045008 | 5/2006 |
| KR | 10-2006-0104070 | 10/2006 |
| KR | 1020070006956 | 1/2007 |
| KR | 1020070014658 | 2/2007 |
| KR | 10-20070089615 | 8/2007 |
| WO | WO 2007/001345 | 8/2005 |
| WO | WO 2008/093181 | 8/2008 |

OTHER PUBLICATIONS

Chinese Office Action and English Translation dated Mar. 30, 2011 for corresponding Chinese Application No. 200810167380.2.

U.S. Appl. No. 12/177,789, filed Jul. 22, 2008, Dae-Won Han, 2009-0123820, Office Action of Feb. 3, 2010 and response Restriction Requirement of Nov. 16, 2009 and response.

U.S. Appl. No. 12/177,789, filed Jul. 22, 2008, Dae-Won Han, 2009-0123820, Final Office Action of Jul. 9, 2010 Office Action of Feb. 3, 2010 and response Restriction Requirement of Nov. 16, 2009 and response.

European Search report for related European Application 08168712.1-1227.

Office Action dated Oct. 4, 2011 for corresponding Japanese Patent Application No. 2008-290030.

SIPO Letters Patent issued Oct. 5, 2011 for corresponding Chinese Patent No. 849511.

FIG. 8

| °C | First examplary embodiment | | | Second examplary embodiment | | | Third examplary embodiment | | |
|---|---|---|---|---|---|---|---|---|---|
| cell | Average | 1/3 point | 2/3 point | Average | 1/3 point | 2/3 point | Average | 1/3 point | 2/3 point |
| 1(max) | 43.9 | 38.7 | 40.8 | 42.9 | 37.7 | 39.7 | 42.3 | 37.2 | 39.1 |
| 2 | 42.6 | 38.0 | 40.2 | 41.7 | 37.3 | 39.3 | 41.2 | 36.9 | 38.8 |
| 3 | 42.0 | 37.1 | 39.0 | 41.3 | 36.6 | 38.3 | 40.8 | 36.2 | 38.0 |
| 4 | 41.3 | 37.1 | 39.0 | 40.7 | 36.5 | 38.3 | 40.3 | 36.2 | 37.9 |
| 5 | 40.9 | 36.4 | 38.1 | 40.3 | 36.0 | 37.6 | 40.0 | 35.8 | 37.4 |
| 6 | 40.4 | 36.3 | 38.1 | 40.8 | 36.4 | 38.3 | 41.4 | 37.0 | 39.1 |
| 7 | 40.1 | 36.0 | 37.5 | 41.2 | 36.3 | 38.2 | 41.6 | 36.7 | 38.8 |
| 8 | 39.9 | 35.9 | 37.5 | 40.5 | 36.3 | 38.0 | 41.0 | 36.7 | 38.6 |
| 9 | 39.5 | 35.6 | 37.1 | 40.5 | 35.9 | 37.6 | 41.0 | 36.4 | 38.3 |
| 10 | 39.5 | 35.6 | 37.0 | 40.3 | 35.6 | 37.4 | 40.7 | 36.0 | 37.9 |
| ΔT | 4.4 | 3.0 | 3.8 | 2.6 | 2.1 | 2.4 | 2.3 | 1.4 | 1.8 |

BATTERY MODULE HAVING COOLANT PASSAGE AND GAS EXHAUST PASSAGE

CROSS-REFERENCE TO RELATED APPLICATION

This application claims priority to and the benefit of Korean Patent Application No. 10-2007-0114939 filed in the Korean Intellectual Property Office on Nov. 12, 2007, the entire content of which is incorporated herein by reference.

BACKGROUND OF THE INVENTION

1. Field of the Invention

The present invention relates to a battery module including a plurality of unit batteries. More particularly, the present invention relates to a battery module having a coolant passage for cooling unit batteries and a gas exhaust passage for exhausting gas generated from the unit batteries.

2. Description of the Related Art

Unlike a primary battery that is incapable of being recharged, a rechargeable battery may be repeatedly charged and discharged. A low capacity rechargeable battery composed of a single cell is generally used for a portable small electronic device, such as a mobile phone, a laptop computer, and a camcorder. A large capacity rechargeable battery composed of a plurality of cells connected in a form of a pack is widely used to drive a motor for a hybrid electric vehicle.

Such rechargeable batteries are serially connected to form a rechargeable battery module to drive a motor for an electric vehicle, which needs a large amount of electric power. In general, a battery module is composed of a plurality of serially connected rechargeable batteries. Hereinafter, the term "rechargeable battery" refers to a unit battery throughout the specification for better understanding and ease of description.

Each unit battery includes an electrode assembly having an anode and a cathode with a separator interposed therebetween, a case having a space for housing the electrode assembly, and a cap assembly coupled to the case for closing and sealing the case and having an electrode terminal electrically connected to the electrode assembly. In general, unit batteries are arranged at regular intervals in a housing and terminals of the unit batteries are connected with each other, thereby forming a battery module.

Since many unit batteries are connected to form one battery module, the battery module must effectively dissipate heat generated from each unit battery. The heat dissipation characteristic of the battery module is very important because the performance of not only the unit batteries but also an electronic device employing the battery module is significantly influenced by the heat dissipation characteristic.

If the heat is not properly dissipated, a large temperature deviation is generated among the unit batteries. Therefore, the battery module may not output sufficient power to drive an electric cleaner, an electric scooter, or a vehicle (e.g., an electric vehicle or a hybrid electric vehicle). If the internal temperature increases by the heat generated from the unit batteries, an abnormal reaction occurs internally. As a result, the charging and discharging performance of the unit batteries is deteriorated.

In addition, gas may be generated in the unit battery while charging and discharging are repeatedly performed. Particularly, since the battery module includes the plurality of unit batteries connected to each other, the gas is required to be quickly and efficiently released. That is, when the gas is not efficiently released, internal pressure increases in the unit battery, and there may be a danger of a rupture or explosion.

However, in conventional battery modules, the heat dissipation and the gas output of the unit battery may not be completely solved. In addition, when a battery module has a configuration for considering the heat dissipation and the gas output in the conventional battery modules, the configuration is complicated or the size of the battery module is problematically increased.

The above information disclosed in this Background section is only for enhancement of understanding of the background of the invention and therefore it may contain information that does not form the prior art that is already known in this country to a person of ordinary skill in the art.

SUMMARY OF THE INVENTION

In one exemplary implementation, an effort has been made to provide a battery module including a coolant passage for exhausting heat from a unit battery and a gas exhaust passage for exhausting gas.

In addition, in one exemplary implementation, an effort has been made in an effort to provide a battery module including a coolant passage for exhausting heat from a unit battery and a gas exhaust passage while a size of the battery module is not problematically increased.

According to an exemplary embodiment of the present invention, a battery module includes a plurality of unit batteries, a housing, and a duct member. The plurality of unit batteries are electrically connected to each other, the housing has a plurality of penetration holes in which the unit batteries are provided to respectively correspond to the unit batteries, and the duct member is combined with the housing to cover electrode terminals of the unit batteries. In addition, the duct member includes a coolant passage through which a coolant is provided to the penetration hole and a gas exhaust passage for exhausting gas generated from the unit batteries in a predetermined direction.

In one exemplary embodiment, the battery module further includes a separating unit formed in the duct member to separate the coolant passage and the gas exhaust passage.

In one exemplary embodiment, the separating unit is protruded toward the electrode terminal of the unit battery such that the coolant passage is penetrated through in a direction toward the electrode terminal.

In one exemplary embodiment, the coolant passage communicates with a space between the unit battery and the penetration hole.

In one exemplary embodiment, the separating unit is formed in plural to respectively correspond to the unit batteries, and the plurality of separating units are formed in a plurality of rows to form the gas exhaust passage between the rows.

In one exemplary embodiment, the duct member includes an outlet communicating with the gas exhaust passage, and the gas generated from the unit batteries is exhausted through the gas exhaust passage and the outlet.

In one exemplary embodiment, the separating unit includes an opening formed in a shape that partially surrounds a circumference of the electrode terminal of the unit battery.

In one exemplary embodiment, the openings of a pair of neighboring separating units among the plurality of separating units face each other.

In one exemplary embodiment, the unit batteries corresponding to the pair of separating units are electrically connected by a terminal plate, and the terminal plate is positioned at a space formed by the openings of the pair of separating units.

In one exemplary embodiment, sizes of the plurality of separating units are differently formed according to locations of the separating units in the duct member.

In one exemplary embodiment, the battery module further includes a covering member having an internal space for supplying the coolant to the coolant passage while covering the duct member.

BRIEF DESCRIPTION OF THE DRAWINGS

FIG. 8 is a table representing the heat generation temperatures of the respective unit batteries shown in FIG. 7A to FIG. 7C.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
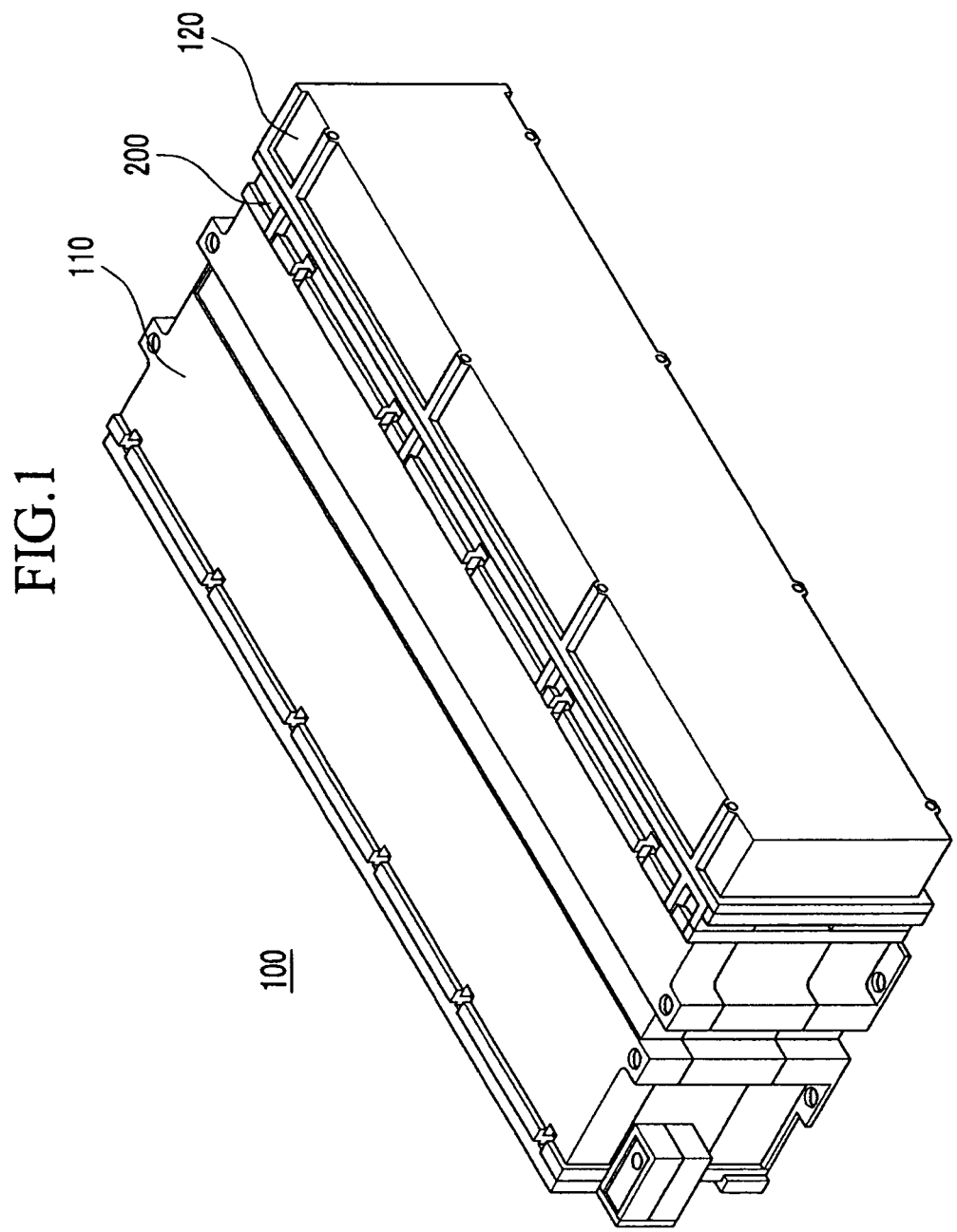
FIG. 1 is a perspective view of a battery module according to an exemplary embodiment of the present invention.

FIG. 1 is a perspective view of a battery module according to an exemplary embodiment of the present invention.

As shown in FIG. 1, a battery module 100 according to the exemplary embodiment of the present invention includes a coolant passage for cooling a temperature of a unit battery to be lower than a predetermined temperature, and a gas exhaust passage for externally exhausting gas generated in the unit battery. That is, the battery module 100 includes following constituent elements.

The battery module 100 includes a housing 110 including a plurality of unit batteries, a covering member 120 combined with the housing 110 to cover the unit batteries, and a duct member 200 integrally combined between the housing 110 and the covering member 120 to cover electrode terminals of the unit batteries.

Figure 2:
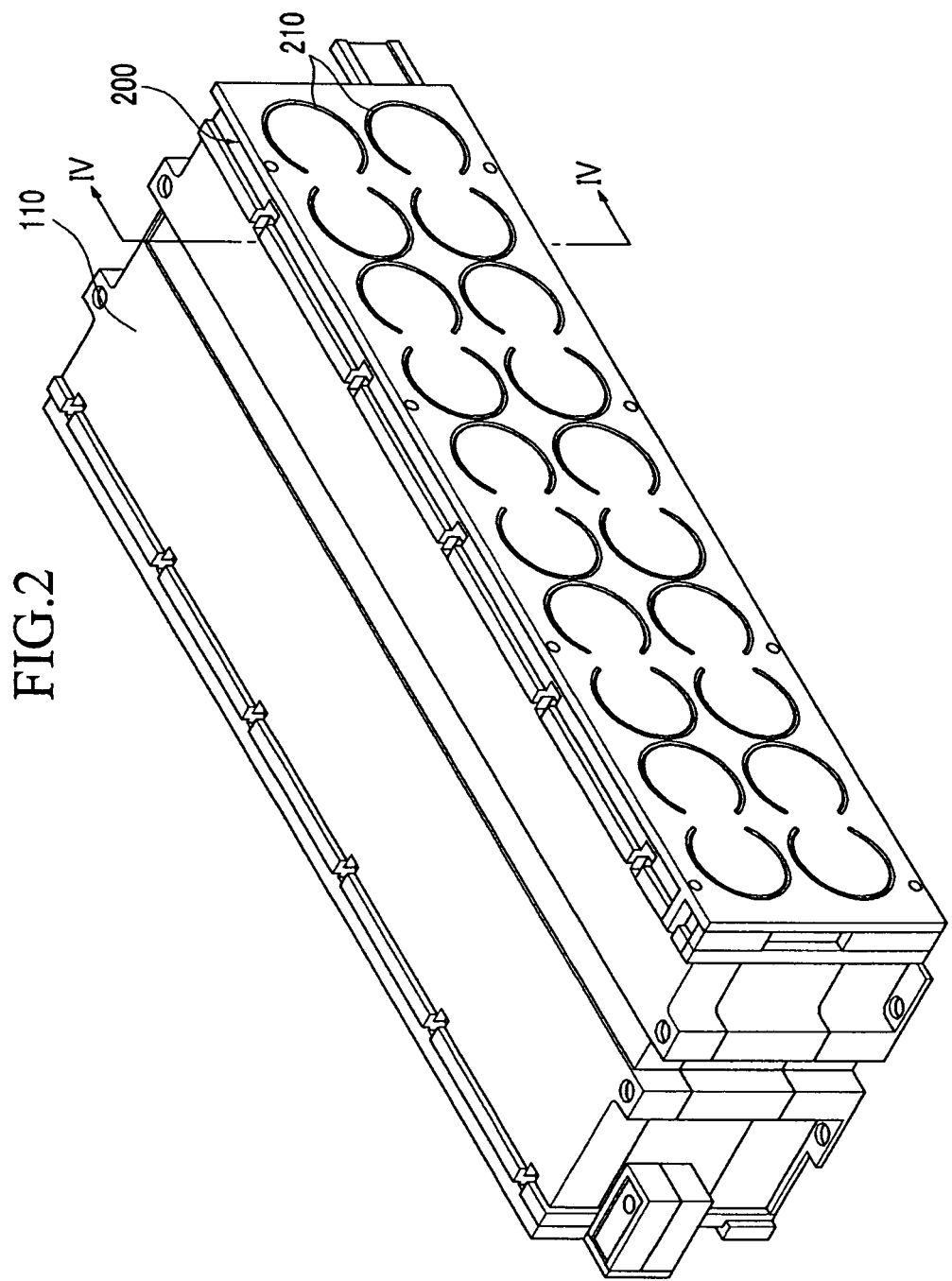
FIG. 2 is a perspective view of a battery module in which a covering member shown in FIG. 1 is removed.

FIG. 2 is a perspective view of a battery module in which the covering member shown in FIG. 1 is removed.

As shown in FIG. 1 and FIG. 2, the duct member 200 includes a coolant passage 210. Since a coolant provided through the coolant passage 210 is supplied to a unit battery in the housing 110, heat generated in the unit battery may be reduced. In this case, air in the atmosphere or cooling air that is cooled to a predetermined temperature may be used as the coolant. The coolant may be externally supplied to the coolant passage 210, or it may be supplied to the coolant passage 210 through the covering member 120. That is, the covering member 120 includes an inner space of a predetermined size to externally receive the coolant. In addition, the covering member 120 dispersedly supplies the coolant to the coolant passage 210.

Figure 3:
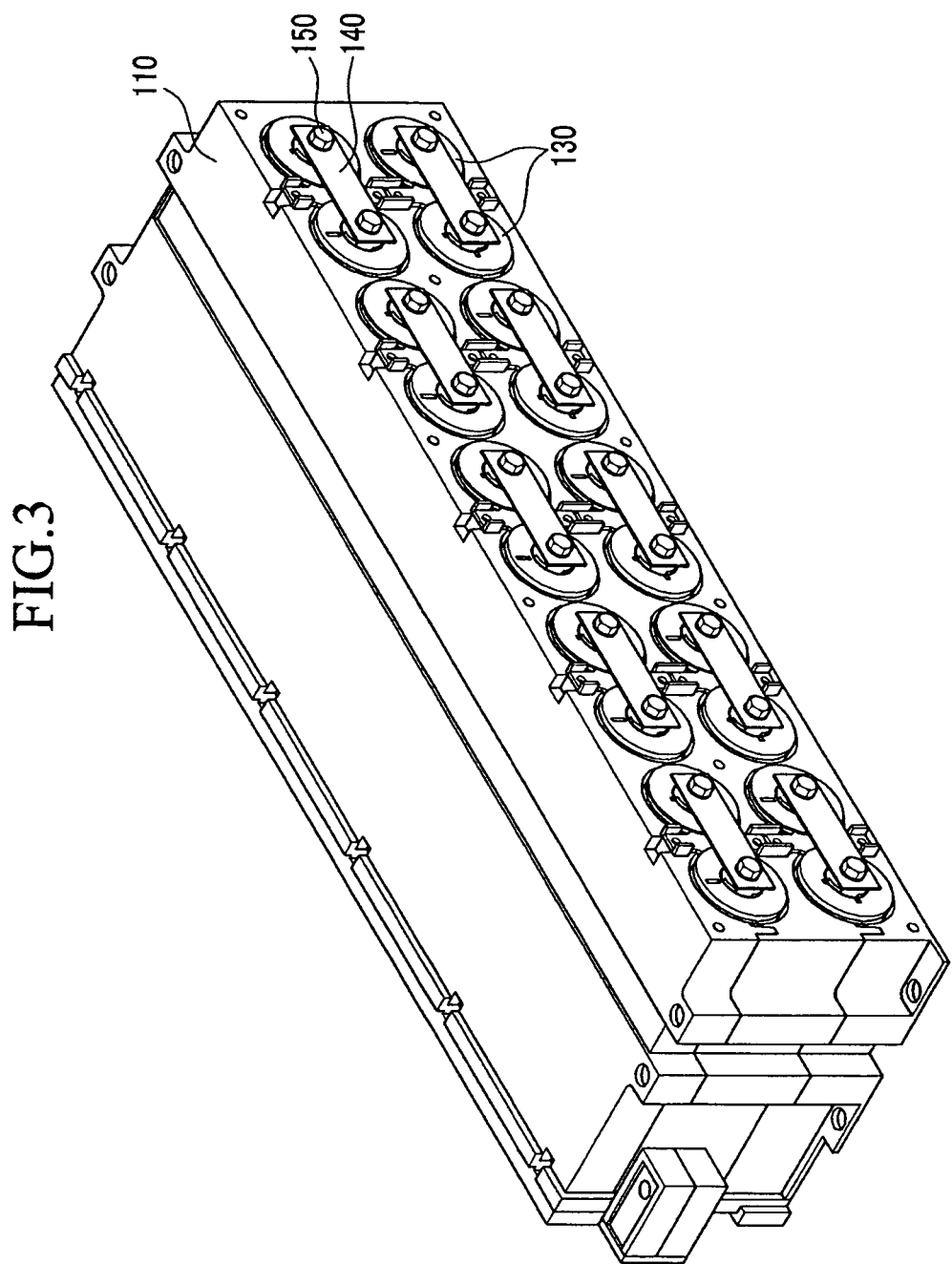
FIG. 3 is a perspective view of the battery module in which a duct member shown in FIG. 2 is eliminated.

FIG. 3 is a perspective view of the battery module in which the duct member 200 shown in FIG. 2 is removed.

As shown in FIG. 1 to FIG. 3, the battery module 100 includes a plurality of unit batteries 130 electrically connected to each other, and the unit batteries 130 are provided in the housing 110.

The housing 110 includes a plurality of penetration holes, and the plurality of unit batteries 130 are respectively provided in the corresponding penetration holes. Here, the plurality of unit batteries 130 are exemplarily shown to be accumulated in two layers in the battery module 100, but they may be accumulated in multiple layers according to power capacity of the battery module 100.

Pairs of neighboring unit batteries 130 among the plurality of unit batteries 130 are electrically connected by a terminal plate 140, and the terminal plate 140 is combined with an electrode terminal of the unit battery 130 by a fastening member 150. A combining relationship and a location relationship among the housing 110, the unit battery 130, and the duct member 200 will now be described.

Figure 4:
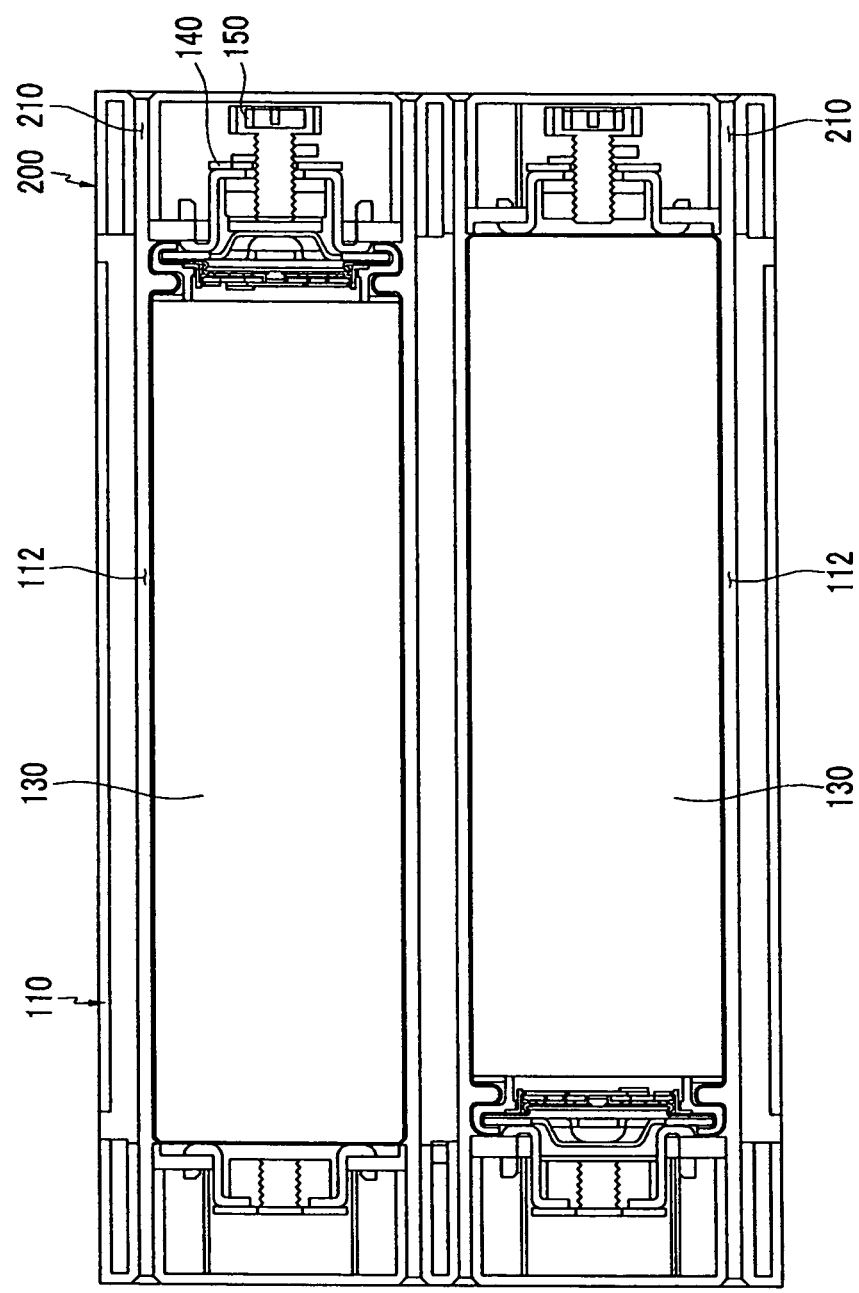
FIG. 4 is a cross-sectional view representing a combining relationship between a housing including a unit battery and the duct member along a line IV-IV shown in FIG. 2.

FIG. 4 is a cross-sectional view representing a combining relationship between the housing including the unit battery and the duct member along a line IV-IV shown in FIG. 2.

As shown in FIG. 1 to FIG. 4, the housing 110 includes a plurality of penetration holes 112 included with the unit batteries 130. In the exemplary embodiment of the present invention, each unit battery 130 is formed in a cylindrical shape, but it is not limited thereto, and it may be formed in a square shape or various other shapes. The penetration hole 112 is formed in a cylindrical shape corresponding to the unit battery 130. However, the penetration hole 112 is formed to be bigger than a cross-section of the cylindrical shape of the unit battery 130, and therefore a space for continuously flowing the coolant is maintained between the unit battery 130 and the penetration hole 112. In addition, since the coolant passage 210 communicates with the space between the unit battery 130 and the penetration hole 112 when the housing 110 and the duct member 200 are combined, the coolant provided through the coolant passage 210 may remove heat generated from a surface of the unit battery 130.

In this case, the plurality of unit batteries 130 are coupled in series in the battery module 100. The unit batteries 130 in the housing 110 are alternately arranged such that anodes or cathodes of the neighboring unit batteries are not arranged in the same direction but are arranged in opposite directions. An anode terminal and a cathode terminal of the neighboring unit batteries 130 are electrically connected by the terminal plate 140.

Figure 5:
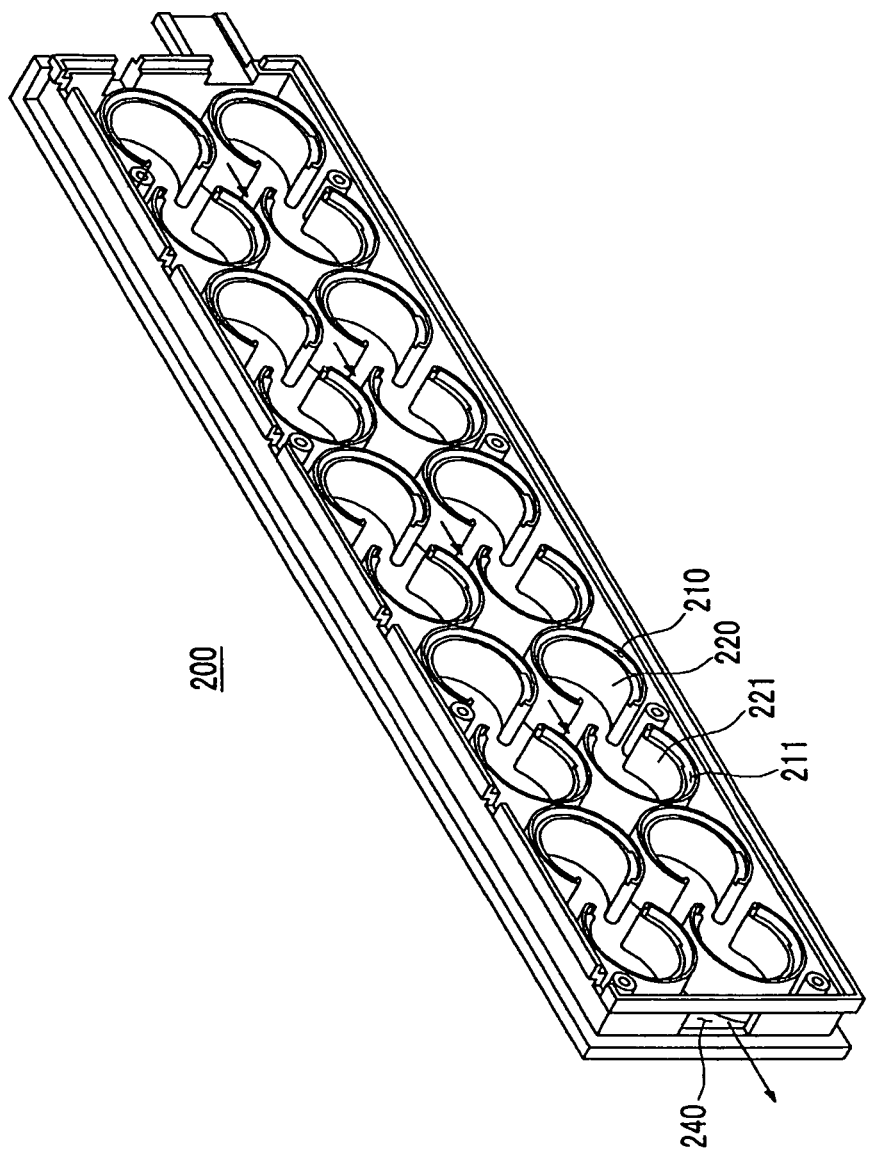
FIG. 5 is a perspective view of the duct member shown in FIG. 2.
Figure 6:
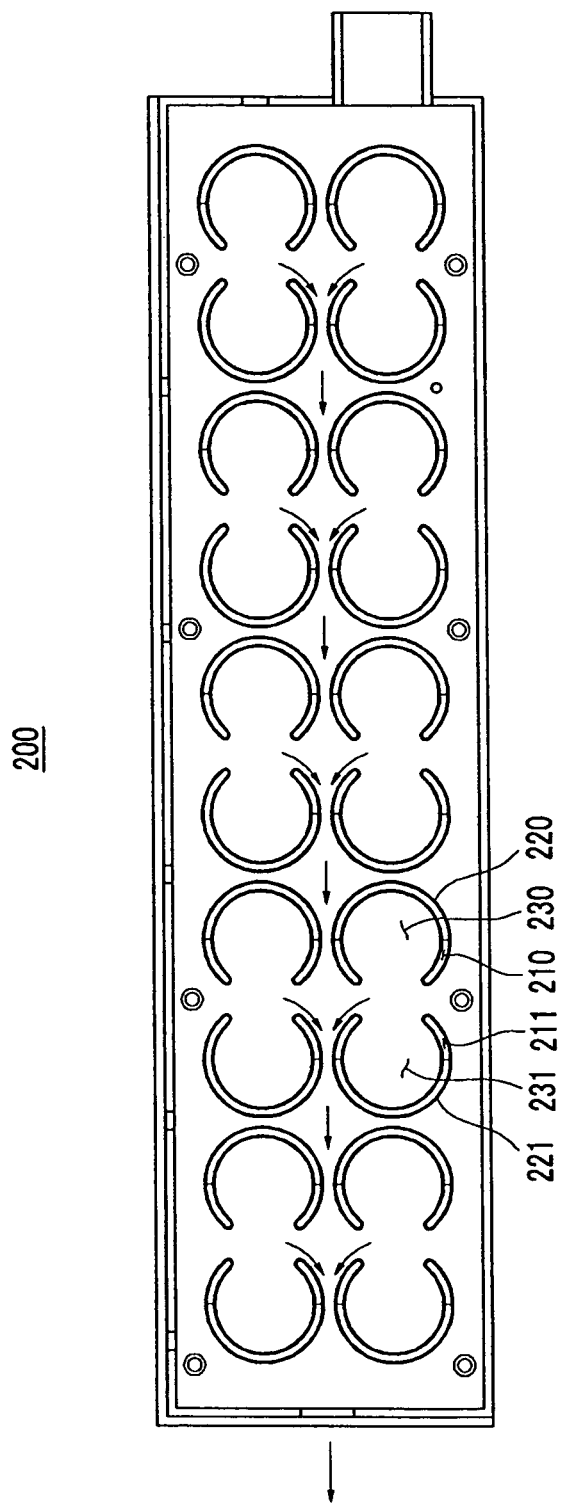
FIG. 6 is a top plan view of the duct member shown in FIG. 5.

The duct member 200 according to the exemplary embodiment of the present invention is formed as shown in FIG. 5 and FIG. 6 to exhaust the gas generated from the unit battery to the outside of the battery module 100.

FIG. 5 is a perspective view of the duct member shown in FIG. 2, and FIG. 6 is a top plan view of the duct member shown in FIG. 5.

As shown in FIG. 1 to FIG. 6, the duct member 200 includes separating units 220 and 221 for separating coolant passages 210 and 211 and the gas exhaust passage. The separating units 220 and 221 are protruded toward the electrode terminal of the unit battery 130 such that the coolant passages 210 and 211 are penetrated through. The separating units 220 and 221 correspond to each unit battery 130, and the plurality of separating units 220 and 221 are arranged in two rows.

Accordingly, the gas exhaust passage (an area where arrows shown in FIG. 5 and FIG. 6 are arranged in a row) is formed between the rows.

A shape of the separating units 220 and 221 will now be described. The separating units 220 and 221 respectively have an opening partially surrounding a circumference of the electrode terminal of the unit battery 130, and are formed in a C shape. As the electrode terminals of each of the unit batteries are provided in inner spaces 230 and 231 of the separating units 220 and 221, the coolant passages 210 and 211 directly communicate with the space between the unit battery 130 and the penetration hole 112. In addition, the gas exhausted from an electrode terminal direction of the unit battery 130 is provided to the gas exhaust passage through the openings of the separating units 220 and 221, and is exhausted from the duct member 200 through the gas exhaust passage.

The separating units 220 and 221 separately form the coolant passages 210 and 211 and the gas exhaust passage, and interrupt the coolant supplied through the coolant passages 210 and 211 from the gas exhausted from the unit battery 130.

In addition, a pair of neighboring separating units 220 and 221 among the plurality of separating units are formed so that the openings face each other. That is, the terminal plate 140 electrically connecting the pair of unit batteries 130 is positioned at a space formed by the openings of the pair of separating units 220 and 221.

Further, the duct member 200 includes an outlet 240 communicating with the gas exhaust passage, and the gas generated from the unit batteries 130 is exhausted through the outlet 240. In this case, the duct member 200 may further include a blowing unit for forcibly inducing gas flow so that the gas generated from the unit batteries 130 flows in one direction along the gas exhaust passage.

Heat is differently generated according to an arrangement of the plurality of unit batteries 130 in the battery module 100, and thermal imbalance may occur between the plurality of unit batteries 130 when the same amount of coolant is supplied. Accordingly, sizes and openings of the plurality of separating units 220 and 221 are differently formed in the battery module 100. That is, since a flowing amount of the coolant may vary according to the openings or the size of the separating units 220 and 221 in the coolant passages 210 and 211, shapes of the plurality of separating units 220 and 221 respectively corresponding to the unit batteries 130 may be varied.

For example, heat of the unit battery 130 located on a center part of the housing 110 may not be efficiently exhausted compared to other unit batteries 130 due to its location. However, in the battery module 100 according to the exemplary embodiment of the present invention, since the openings and the size of the separating units 220 and 221 corresponding to the unit battery 130 at a predetermined area are formed to be relatively greater than other unit batteries 130, cooling performance of the unit battery 130 at the predetermined area may be increased.

Figure 7A:
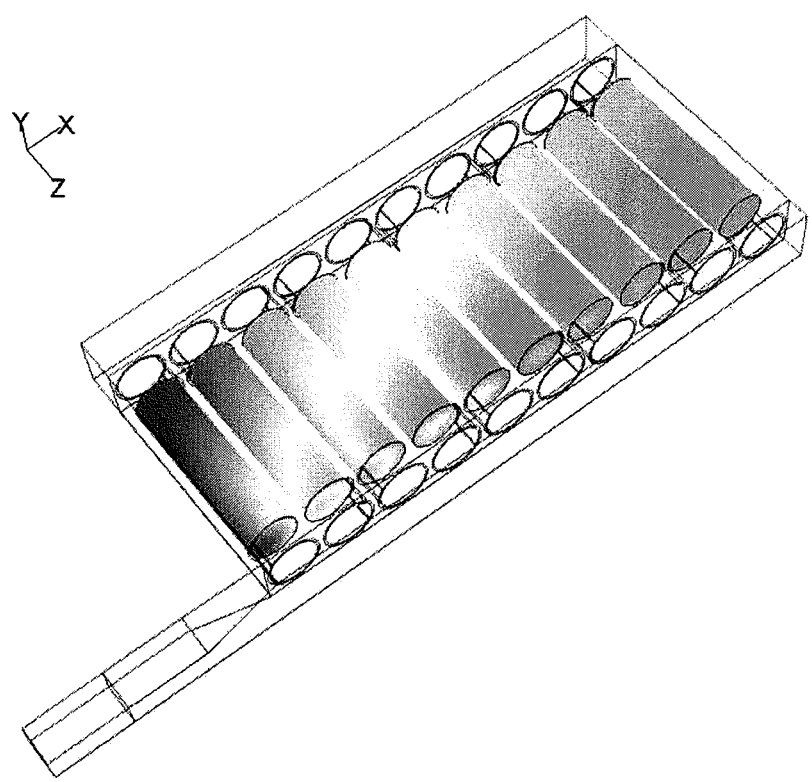
FIG. 7A to FIG. 7C show diagrams representing heat generation temperatures in the unit batteries of the battery module to which the duct members shown are applied.
Figure 7B:
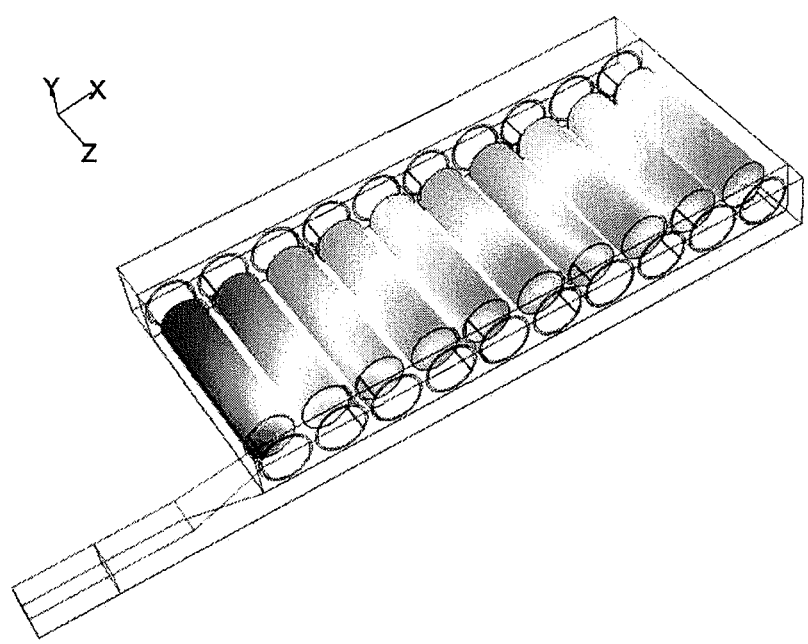
Figure 7C:
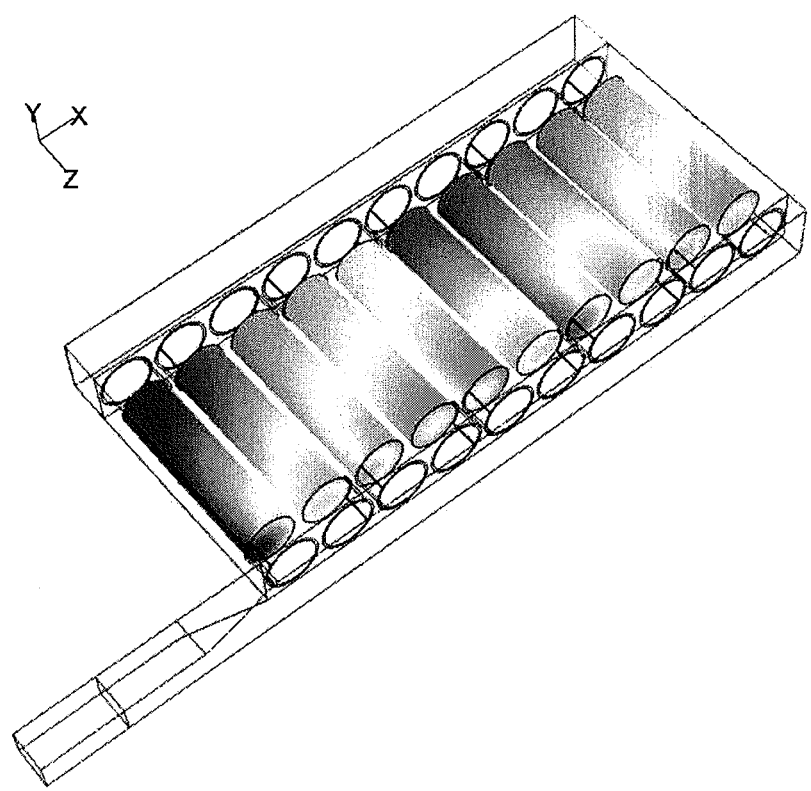

FIG. 7A to FIG. 7C show diagrams representing the duct members that may be applied to the battery module according to the exemplary embodiment of the present invention.

A plurality of different exemplary embodiments can be used to demonstrate the efficacy of this invention. In one embodiment, the plurality of separating units are respectively formed to cover 76° of circular sections in a first exemplary embodiment, and five separating units positioned on an upper row among the plurality of separating units are respectively formed to cover 180° of circular sections and remaining separating units are respectively formed to cover 76° of circular sections in a second exemplary embodiment. In a third exemplary embodiment, five respective separating units positioned on upper and lower rows among the plurality of separating units are respectively formed to cover 180° of circular sections, and remaining separating units are formed to cover 76° of circular sections.

For the exemplary embodiment described above, heat generation temperatures in the respective unit batteries in the battery modules are shown as FIG. 7A to FIG. 7C, and measured values of the temperatures are given as in FIG. 8. In this case, the temperatures are surface temperatures of the respective unit batteries, and an average temperature, a temperature measured at a ⅓ point in a length direction of the unit cell, and a temperature measured at a ⅔ point in the length direction of the unit cell are shown.

Particularly, since the separating units are differently formed with respect to the unit batteries at predetermined areas in the third exemplary embodiment (FIG. 7C), temperature deviation of the unit batteries is less than in the first and second exemplary embodiments.

Figure 9:
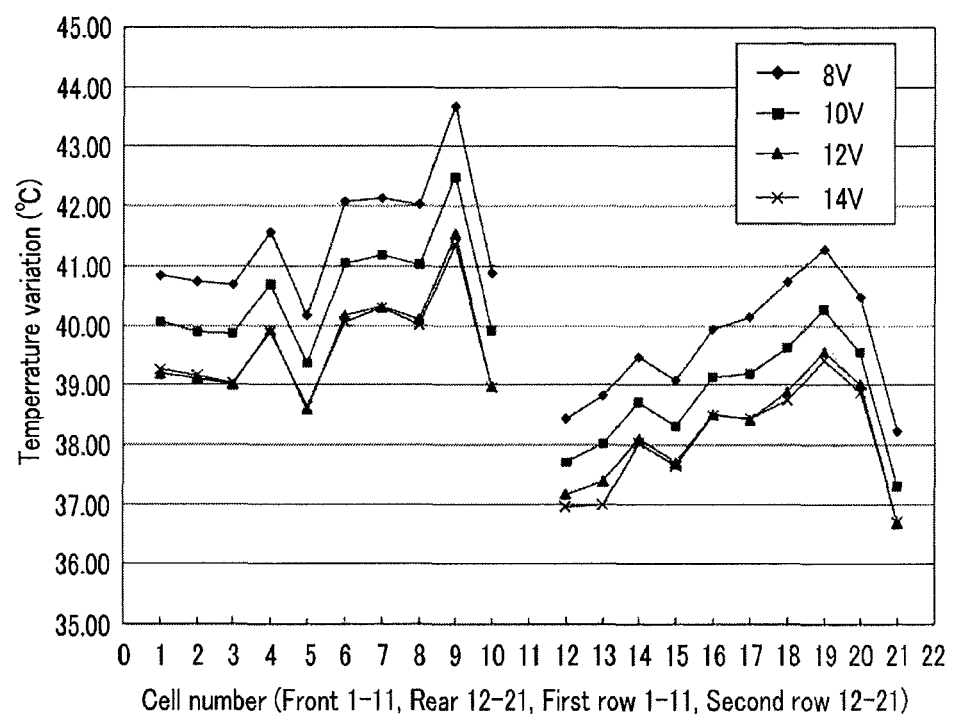
FIG. 9 is a graph representing temperatures of the respective cells in the third exemplary embodiment shown in FIG. 8.

FIG. 9 is a graph representing temperatures of the respective cells in the third exemplary embodiment shown in FIG. 8.

As shown in FIG. 9, in the respective batteries, heat generation varies according to voltages 8V, 10V, 12V, and 14V of a cooling fan, but heat generation temperatures of cells 12 to 21 are lower than the heat generation temperatures of cells 1 to 10. That is, the separating units are formed to cover 76° of the circular sections in the cells 1 to 10, and the separating units are formed to cover 180° of the circular sections in the cells 12 to 21. As described, in the exemplary embodiment of the present invention, since the shape and sizes of the separating units are differently formed in the battery module, the temperatures of the unit batteries may be controlled.

In the battery module according to the exemplary embodiment of the present invention, the gas generated from the unit battery may be efficiently exhausted while the unit battery is cooled down. Accordingly, the battery module may be more stably driven and may efficiently output required power.

Further, while the battery module according to the exemplary embodiment of the present invention separately includes a coolant passage for heat dissipation of the unit battery and a gas exhaust passage for exhausting gas, the size of the battery module may not be problematically increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
   a plurality of unit batteries electrically connected to each other;
   a housing having a plurality of penetration holes in which the unit batteries are provided to respectively correspond to the unit batteries; and
   a duct member combined with the housing to cover electrode terminals of the unit batteries,
   wherein the duct member includes a first surface and comprises a plurality of coolant passages through which a coolant is provided to the penetration hole and a gas exhaust passage adjacent the first surface for exhausting gas generated from the unit batteries in a predetermined direction; and
   a plurality of separating members formed in the duct member so as to extend outward from the first surface to separate the coolant passage of each of the unit batteries from the gas exhaust passage, wherein each separating member has side walls that define an opening having a C-shaped cross-section positioned at the outer end of the plurality of separating members.

2. The battery module of claim 1, wherein the separating unit is protruded toward the electrode terminal of the unit battery such that the coolant passage is penetrated through in a direction toward the electrode terminal.

3. The battery module of claim 2, wherein the coolant passage communicates with a space between the unit battery and the penetration hole.

4. The battery module of claim 2, wherein the plurality of separating members to respectively corresponds to the unit batteries, and the plurality of separating members are formed in a plurality of rows to form the gas exhaust passage between the rows.

5. The battery module of claim 4, wherein the duct member includes an outlet communicating with the gas exhaust passage, and the gas generated from the unit batteries is exhausted through the gas exhaust passage and the outlet.

6. The battery module of claim 4, wherein each of the plurality of separating members has an opening formed in a shape that partially surrounds the circumference of the electrode terminal of the unit battery.

7. The battery module of claim 6, wherein the unit battery and the penetration hole are formed in a cylindrical shape.

8. The battery module of claim 6, wherein the openings of a pair of neighboring separating members among the plurality of separating units face each other.

9. The battery module of claim 8, wherein the unit batteries corresponding to the pair of separating members are adjacent to each other and electrically connected by a terminal plate, and the terminal plate is positioned in a space formed by the openings of the pair of separating members.

10. The battery module of claim 1, further comprising a covering member having an internal space for supplying the coolant to the coolant passage while covering the duct member.

11. The battery module of claim 10, wherein the covering member is integrally combined with the housing by using the duct member.

12. A battery module comprising:
a plurality of batteries wherein at least some of the batteries are electrically coupled to each other;
a housing that defines a plurality of openings that are sized so as to receive the plurality of batteries, wherein the plurality of openings are further sized so as to provide a space about the outer surface of the plurality of batteries positioned therein so as to permit fluid to flow over the outer surface of the batteries to facilitate heat dissipation;
a duct member that is positioned on the housing wherein the duct member has a first surface and defines a flow path adjacent the first surface that allows coolant to be circulated into the plurality of openings to facilitate heat dissipation about the batteries and a gas exhaust passage that permits removal of heat from the housing; and
a plurality of separating members formed in the duct member so as to extend outward from the first surface to separate the fluid flow in the space of each of the unit batteries from the gas exhaust passage, wherein the separating member has side walls with an opening having a C-shaped cross-section positioned at the outer end of the separating members.

13. The module of claim 12, wherein the plurality of batteries and the plurality of openings are cylindrical in shape.

14. The module of claim 12, wherein the duct member defines a coolant passage that extends through the duct member wherein the coolant passage is in fluid communication with the plurality of openings in the housing and wherein the duct member defines a gas exhaust passage that allows for gas to be removed from the housing.

* * * * *